United States Patent
Osada et al.

(10) Patent No.: US 9,796,087 B2
(45) Date of Patent: Oct. 24, 2017

(54) CONTROL SYSTEM FOR POWER UNIT

(71) Applicant: HONDA MOTOR CO., LTD., Tokyo (JP)

(72) Inventors: Masahiko Osada, Saitama (JP); Yoshiki Kanemoto, Saitama (JP); Kei Usui, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 32 days.

(21) Appl. No.: 14/743,416

(22) Filed: Jun. 18, 2015

(65) Prior Publication Data

US 2016/0067865 A1    Mar. 10, 2016

(30) Foreign Application Priority Data

Sep. 9, 2014    (JP) .................................. 2014-183230

(51) Int. Cl.
G05B 19/04    (2006.01)
G05B 19/18    (2006.01)
B25J 9/16    (2006.01)

(52) U.S. Cl.
CPC ........... B25J 9/1641 (2013.01); B25J 9/1633 (2013.01); *G05B 2219/39186* (2013.01); *G05B 2219/39353* (2013.01); *Y10S 901/09* (2013.01)

(58) Field of Classification Search
CPC ...... B25J 9/1641; B25J 9/1633; B25J 9/1694; B25J 9/16; G05B 2219/39186; G05B 2219/39353; G05B 11/32; G05B 11/02; G05B 17/02; Y10S 901/09
See application file for complete search history.

(56) References Cited

U.S. PATENT DOCUMENTS

| 4,535,277 | A | * | 8/1985 | Kurakake | .............. | G05B 19/39 318/561 |
| 5,036,266 | A | * | 7/1991 | Burke | ..................... | H02P 23/16 310/15 |
| 6,515,442 | B1 | * | 2/2003 | Okubo | ................... | G05B 19/19 318/560 |

(Continued)

FOREIGN PATENT DOCUMENTS

JP    2001-195133    7/2001

OTHER PUBLICATIONS

"High-Fidelity Joint Drive System by Torque Feedback Control Using High Precision Linear Encoder", Tomohiro Kawakami et al., 2010 IEEE International Conference on Robotics and Automation Anchorage Convention District, May 3-8, 2010, Anchorage, Alaska, USA, Discussed in specification, English text.

*Primary Examiner* — Rachid Bendidi
(74) *Attorney, Agent, or Firm* — Rankin, Hill & Clark LLP

(57) ABSTRACT

A control system of a power unit in accordance with the present invention corrects a basic command value of an electric motor 2, which has been determined such that the detection value of a driving force to be applied to a rotary member 5 is converged to a desired value, according to a manipulated variable determined by an observer 16. The electric motor 2 is controlled according to a desired control value after the correction. The observer 16 determines the manipulated variable such that the driving force based on the desired control value is brought close to the resultant force of a force indicated by the rotary member 5 and an inertial force.

4 Claims, 6 Drawing Sheets

(56) References Cited

U.S. PATENT DOCUMENTS

2008/0075561 A1\* 3/2008 Takemura ............... F16F 1/025
                                                    414/2
2012/0239198 A1\* 9/2012 Orita ..................... B25J 9/1641
                                                    700/260

\* cited by examiner

CONTROL SYSTEM FOR POWER UNIT

BACKGROUND OF THE INVENTION

1. Field of the Invention

The present invention relates to a system that controls the driving force imparted from an actuator to an element to be driven, such as a link connected to a joint of a robot.

2. Description of the Related Art

As a power unit that drives a joint mechanism of a robot or the like, there has conventionally been known a power unit in which a spring member is interposed between an output section of an actuator and an element to be driven, such as a joint mechanism, and which is adapted to control the actuator such that the driving force (a translational force or a moment) applied to the element to be driven follows a desired value.

This type of unit is described in, for example, Japanese Patent Application Laid-open No. 2001-195133 (hereinafter referred to as Patent Document 1) or "High-Fidelity Joint Drive System by Torque Feedback Control Using High Precision Linear Encoder/Tomohiro Kawakami, Ko Ayusawa, Hiroshi Kaminaga, Yoshihiko Nakamura/2010 IEEE International Conference on Robotics and Automation Anchorage Convention District/May 3-8, 2010, Anchorage, Ak., USA" (hereinafter referred to as Non-Patent Document 1).

In the foregoing power unit, the driving force is usually transmitted from the actuator to the spring member through the intermediary of a power transmission element, such as a reduction gear.

In this case, the power transmission element, such as a speed reducer, is more rigid than the spring member. However, the power transmission element, including the reduction gear, generally has a certain level of springiness, and the springiness of the power transmission element may give rise to the oscillation phenomenon of the driving force applied to the element to be driven.

Further, Patent Document 1 mentioned above, for example, proposes a technique for suppressing the backlash oscillation of a gear, which serves as the power transmission element, by using an observer.

However, the technique described in Patent Document 1 does not take into account the influences of the rotational friction or the viscosity or the like of the output shaft of the actuator. Hence, the influences may prevent the driving force, which is actually applied to the element to be driven, from following a desired value.

Meanwhile, a technique for compensating for the influence of the friction by using the observer has been proposed in Non-Patent Document 1.

The technique, however, does not take into account the springiness of the power transmission element, such as a reduction gear, interposed between the actuator and the spring member. Therefore, the driving force actually applied to the element to be driven may develop the oscillation phenomenon or the like due to the influence of the springiness.

SUMMARY OF THE INVENTION

The present invention has been made in view of the background described above, and an object of the invention is to provide a control system capable of controlling a force, which is applied to an element to be driven from an actuator through the intermediary of a springy power transmission element and a spring member, to a desired value with high stability while suppressing mainly the occurrence of oscillation.

To this end, a control system for a power unit in accordance with the present invention is a control system for a power unit that has an actuator, which outputs a driving force for actuating an element to be driven, and a spring member, which receives the driving force of the actuator through the intermediary of a power transmission element, converts the received driving force into an elastic force and imparts the elastic force to the element to be driven, the power transmission element being configured to exhibit springiness between an input section thereof adjacent to the actuator and an output section thereof adjacent to the spring member, the control system including:

a force detecting unit that generates an output based on a force actually applied to the element to be driven;

a displacement motion detecting unit that generates an output based on a displacement motion of the output section of the actuator;

a basic command value determining unit that sequentially determines a basic command value for controlling the driving force of the actuator according to an output of the force detecting unit and a desired value of a force to be applied to the element to be driven so as to converge a value of a force indicated by an output of the force detecting unit to the desired value of the force;

an actuator control unit that sequentially determines a desired actuator control value that defines a driving force to be actually output from the actuator and controls the actuator according to the desired actuator control value; and a manipulated variable determining unit that determines a manipulated variable for correcting the basic command value based on an output of the displacement motion detecting unit, an output of the force detecting unit, and a desired actuator control value determined by the actuator control unit so as to bring a driving force, which is to be applied to the element to be driven according to the desired actuator control value, close to a resultant force of an inertial force, which is defined by a value of a displacement acceleration of the output section of the actuator indicated by an output of the displacement motion detecting unit and a set value of an inertial mass or an inertial moment of a system extending from the actuator to the spring member, and a force indicated by an output of the force detecting unit, wherein the actuator control unit is configured to determine the desired actuator control value by correcting the basic command value according to the manipulated variable at the time of determining a new desired actuator control value (a first aspect of the invention).

In the present invention, the springiness of the power transmission element exhibited between the input section thereof adjacent to the actuator and the output section thereof adjacent to the spring member means a characteristic in which, when one of the input section and the output section is fixed and a driving force is applied to the other to cause a displacement thereof, the displacement amount of the other changes by an amount based on the driving force applied to the other.

Further, the driving force (or the force) in the present invention means a translational force or torque (moment).

Further, the actuator in the present invention may be a linear motion type or a rotary type actuator. If the actuator is a linear motion type actuator, then the displacement motion of the output section of the actuator means the translational motion of the output section. If the actuator is a rotary type actuator, then the displacement motion of the output section means a rotational motion of the output section. Further, the element to be driven in the present invention may be either a rotatable element or an element that carries out a linear displacement.

Further, the value (detection value) of a state amount indicated by an output of the displacement motion detecting unit in the present invention is not limited to a detection value directly obtained from the output, and a value obtained as a temporal differentiated value or an integrated value of the detection value is also regarded as the detection value of the state amount indicated by an output of the displacement motion detecting unit. For example, if a value directly obtained from an output of the displacement motion detecting unit indicates a displacement velocity (a translational velocity or a rotational velocity), then not only the displacement velocity but also a displacement amount obtained by integrating the displacement velocity or a displacement acceleration obtained by differentiating the displacement velocity will be regarded as a detection value indicated by the output of the displacement motion detecting unit.

According to the first aspect of the invention described above, the desired control value, which defines the driving force to be actually output from the actuator, is determined by correcting the basic command value determined by the basic command value determining unit according to the manipulated variable determined by the manipulated variable determining unit. Then, the actuator is controlled based on the desired control value.

In this case, the basic command value is sequentially determined such that the value of the force indicated by an output of the force detecting unit (the detection value of the force actually applied to the element to be driven) is converged to the desired value of the force to be applied to the element to be driven.

Meanwhile, the manipulated variable is determined to bring a driving force, which is applied to the element to be driven according to the desired actuator control value, close to a resultant force of an inertial force, which is defined by a value of a displacement acceleration of the output section of the actuator indicated by an output of the displacement motion detecting unit and a set value of an inertial mass or an inertial moment of a system extending from the actuator to the spring member, and a force indicated by an output of the force detecting unit.

In this case, the resultant force corresponds to the estimated value of the driving force to be output from the actuator when the system extending from the actuator to the spring member is regarded as a system that has only an inertial mass or inertial moment without having an elastic element, a frictional element or a viscous element. The manipulated variable, therefore, corresponds to a manipulated variable that functions to remove the influence of the elastic force, the frictional force or the viscous force that the system extending from the actuator to the spring member actually has.

Hence, by controlling the actuator according to the desired control value determined by correcting the basic command value according to the manipulated variable, the force actually applied to the element to be driven can be controlled to a desired value while obviating as much as possible the influence of the elastic force, the frictional force or the viscous force that the system extending from the actuator to the spring member actually has.

Thus, the first aspect of the invention makes it possible to control the force, which is applied from the actuator to the element to be driven through the intermediary of the springy power transmission element and the spring member, to a desired value with high stability while suppressing the occurrence of oscillation and the like.

According to the first aspect of the invention, in the processing by the manipulated variable determining unit, directly calculating the resultant force itself is not essential. In other words, the manipulated variable determining unit may be configured to determine the manipulated variable to consequently bring the driving force applied to the element to be driven close to the resultant force according to the desired actuator control value.

Hence, the first aspect of the invention may adopt, for example, the following mode. Preferably, the manipulated variable determining unit includes a low-pass filter to which a linearly combined value of a value of a displacement velocity of the output section of the actuator indicated by an output of the displacement motion detecting unit, a value of a force indicated by an output of the force detecting unit, and an estimated value of the driving force applied to the element to be driven according to the desired actuator control value are input, and the manipulated variable determining unit is configured to determine the manipulated variable by multiplying a difference between an output value of the low-pass filter and a term related to a value of the displacement velocity in the linearly combined value by a predetermined gain value (a second aspect of the invention).

The second aspect of the invention makes it possible to determine the manipulated variable such that the driving force applied to the element to be driven is consequently brought close to the resultant force according to the desired actuator control value without the need for directly calculating the resultant force.

Further, in this case, the processing of directly calculating the resultant force is unnecessary, thus obviating the need for the processing of calculating the temporal change rate (differential value) of the value of the displacement velocity of the output section of the actuator indicated by an output of the displacement motion detecting unit. This permits higher reliability of the manipulated variable. As a result, the stability of controlling the force actually applied to the element to be driven can be effectively enhanced.

In the second aspect of the invention described above, the following mode, for example, may be adopted as a more specific mode. For example, the foregoing low-pass filter is a low-pass filter configured such that the transfer function thereof is represented by expression (A1) given below, and the manipulated variable determining unit is configured to input the linearly combined value calculated according to expression (A2) given below to the low-pass filter (a third aspect of the invention).

$$\text{The transfer function} = 1/(1+s \cdot Tobs) \quad (A1)$$

where Tobs: Predetermined time constant $$\text{The linearly combined value} = \alpha 1 \cdot ((J/Tobs) \cdot V - Fa + Fc) \quad (A2)$$

where α1: Arbitrary constant other than zero; J: Set value of the inertial mass or inertial moment; V: Value of the displacement velocity of the output section of the actuator; Fa: Value of the force indicated by an output of the force detecting unit; and Fc: Estimated value of the driving force.

Further, "s" denotes an operand of Laplace transform.

The first aspect of the invention may also adopt the following mode. The manipulated variable determining unit includes, for example, a low-pass filter that receives a linearly combined value obtained by linearly combining, according to expression (B1) given below, a temporal change rate of a displacement velocity (dV/dt) of the output section of the actuator indicated by an output of the displacement motion detecting unit, a value of force (Fa) indicated by an output of the force detecting unit, and an estimated value of a driving force (Fc) applied to the element to be driven according to the desired actuator control value, wherein a value obtained by multiplying an output value of the low-pass filter by a predetermined gain value is determined as the manipulated variable (a fourth aspect of the invention).

$$\text{Linearly combined value} = \alpha 2 \cdot (Fc - Fa - J \cdot (dV/dt)) \quad \text{(B1)}$$

where $\alpha 2$: Arbitrary constant other than zero; and J: Set value of the inertial mass or inertial moment.

This arrangement makes it possible to determine the manipulated variable while compensating for the influence of a high-frequency noise component included in an output of the displacement motion detecting unit or the force detecting unit by supplying the linearly combined value calculated according to expression (B1) given above to the low-pass filter.

DESCRIPTION OF THE PREFERRED EMBODIMENTS

First Embodiment

A first embodiment of the present invention will be described below with reference to FIG. 1 and FIG. 2.

Figure 1:
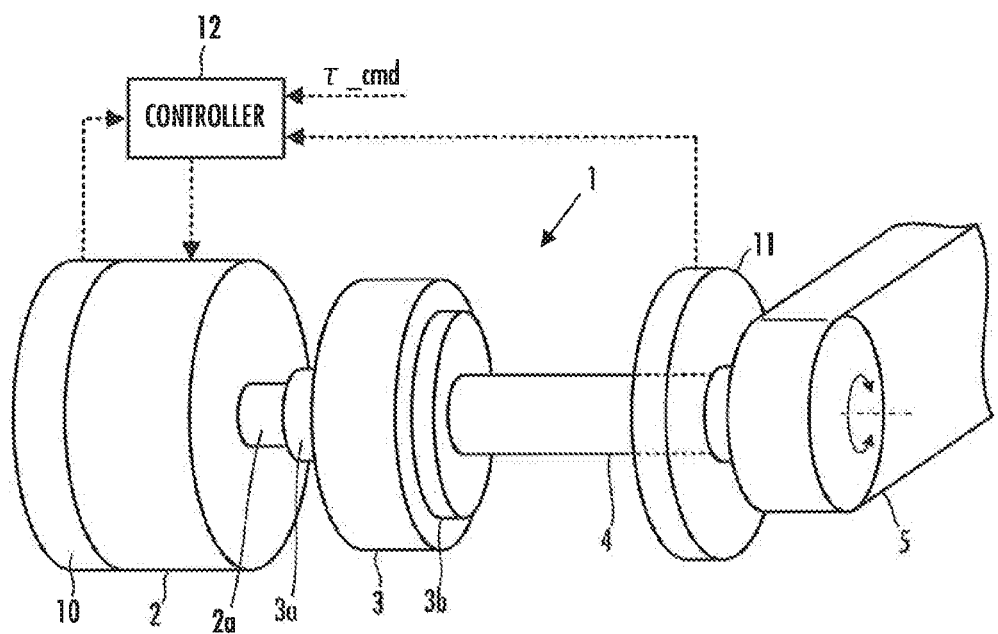
FIG. 1 is a diagram illustrating the entire configuration of a control system according to an embodiment of the present invention.

Referring to FIG. 1, a power unit 1 according to the present embodiment is a unit that rotatively drives a rotary member 5, which functions as an element to be driven, by a driving force of an electric motor 2. In the power unit 1, a power transmission system between the electric motor 2 and the rotary member 5 is provided with a reduction gear 3 and a torsion bar 4.

The rotary member 5 is, for example, a constituent element of a joint of a robot (a link member rotatable about a joint axis). However, the rotary member 5 may be another member.

The electric motor 2 corresponds to the actuator in the present invention. The electric motor 2 in the present embodiment is a rotary type actuator that outputs a rotative driving force (torque) from an output shaft 2a serving as an output section thereof.

The reduction gear 3 constitutes the power transmission element in the present invention. The reduction gear 3 in the present embodiment is constituted of a wave gear device, such as Harmonic Drive (registered trademark). Further, the reduction gear 3 has springiness between an input section (input shaft) 3a thereof and an output section (output shaft) 3b.

More specifically, if one of the input section 3a and the output section 3b of the reduction gear 3 (e.g. the output section 3b) is fixed and a driving force (torque) is applied to the input section 3a, then the displacement amount (rotational angle) of the input section 3a changes according to the driving force applied to the input section 3a. However, the springiness between the input section (input shaft) 3a and the output section (output shaft) 3b of the reduction gear 3 is lower than the springiness of the torsion bar 4.

Further, the input section 3a of the reduction gear 3 is connected to the output shaft 2a such that the input section 3a can be rotated together with the output shaft 2a of the electric motor 2.

Supplementary, the reduction gear 3 may be constituted of a power transmission mechanism other than the wave gear device, and may be constituted of, for example, a gear type power transmission mechanism, such as a planetary gear device, or a power transmission mechanism that has an endless strip member, such as a belt or a chain, or a combination of these power transmission mechanisms. Each of the power transmission mechanisms other than the wave gear device usually has a certain level of springiness between the input section and the output section thereof.

The torsion bar 4 corresponds to the spring member in the present invention. In this case, the torsion bar 4 generates an elastic force (twisting force) based on the difference in rotational angle between one end and the other end thereof. Further, one end (the end on the input side) of the torsion bar 4 is connected to the output section 3b such that the one end can be rotated together with the output section 3b of the reduction gear 3.

Further, the rotary member 5 is connected to the other end (the end on the output side) of the torsion bar 4 such that the rotary member 5 can be rotated together with the other end.

In the configuration of the power unit 1 described above, the rotative driving force (torque) output by the electric motor 2 is supplied from the output shaft 2a of the electric motor 2 to the torsion bar 4 through the intermediary of the reduction gear 3. Then, the rotative driving force supplied to the torsion bar 4 is converted into an elastic force (the twisting force) by the torsion bar 4, and the elastic force is applied as the rotative driving force to the rotary member 5.

The dynamic behavior of the power transmission system of the power unit 1 having the foregoing configuration can be expressed as the behaviors of a three-inertia system model comprised of the electric motor 2, the reduction gear 3 and the rotary member 5, which are regarded as three rotary members having inertial moments.

According to the present embodiment, in the power unit 1 having the configuration described above, the operation of the electric motor 2 is controlled such that the torque (the rotative driving force) actually applied from the electric motor 2 to the rotary member 5 through the intermediary of the reduction gear 3 and the torsion bar 4 reaches desired torque.

To carry out the operation control, the system according to the present embodiment is provided with a rotation detector 10 that generates an output based on the rotation of the output shaft 2a of the electric motor 2 (corresponding to the displacement motion of the output section of the actuator in the present invention), a torque detector 11 that generates an output based on the torque (rotative driving force) actually applied to the rotary member 5, and a controller 12.

The rotation detector 10 corresponds to the displacement motion detecting unit in the present invention. The rotation detector 10 is constituted of, for example, a rotary encoder. In the illustrated example, the rotation detector 10 is attached to the electric motor 2 so as to output a signal based on the actual rotational angular velocity of the output shaft 2a of the electric motor 2. The rotation detector 10 may be comprised of a potentiometer, a resolver, a Hall element or the like.

Supplementary, if the value of any one of the rotational angle, the rotational velocity and the rotational angular velocity of the output shaft 2a of the electric motor 2 is detected, then the remaining values can be identified by carrying out differentiation operation or integration operation from the detection value of any one of the values. Therefore, the signal output from the rotation detector 10 may be any one of a signal based on the rotational angle of the output shaft 2a of the electric motor 2, a signal based on the rotational velocity thereof, and a signal based on the rotational angular acceleration thereof.

The torque detector 11 corresponds to the force detecting unit in the present invention. The torque detector 11 is constituted of an angle detector that generates an output based on, for example, a torsion angle of the torsion bar 4 (the difference in rotational angle between one end and the other end). In the illustrated example, the torque detector 11 is disposed between the reduction gear 3 and the rotary member 5.

The elastic force generated in the torsion bar 4 and the consequent rotative driving force (torque) applied to the rotary member 5 from the torsion bar 4 will be substantially proportional to the torsion angle of the torsion bar 4. Hence, the torque actually applied to the rotary member 5 (hereinafter referred to as "the actual rotary member driving torque") can be detected using a predetermined arithmetic expression established beforehand or a map or the like on the basis of the detection value of the torsion angle of the torsion bar 4 recognized from an output of the torque detector 11.

The torque detector 11 may be a detector other than the angle detector. The torque detector 11 may be constituted of, for example, a strain gauge type torque detector or the like provided with a strain element. In this case, the actual rotary member driving torque can be directly detected from an output of the torque detector 11.

The controller 12 is comprised of an electronic circuit unit that includes a CPU, a RAM, a ROM, an interface circuit and the like. The controller 12 receives the outputs of the rotation detector 10 and the torque detector 11. Further, the controller 12 is adapted to sequentially receive from an external source a desired torque $\tau$_cmd, which is the desired value of the torque to be applied to the rotary member 5.

The controller 12 may alternatively be constituted of a plurality of electronic circuit units capable of intercommunication.

Further, the controller 12 controls the operation of the electric motor 2 by using the received data.

Figure 2:
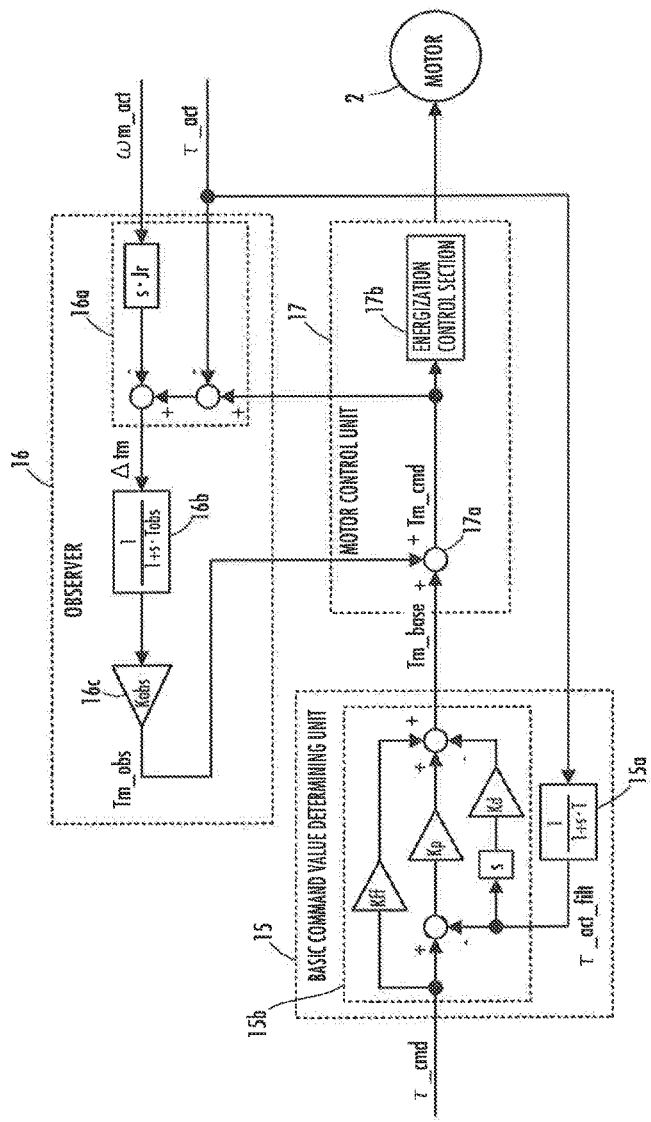
FIG. 2 is a block diagram illustrating a configuration related to control according to a first embodiment of the present invention.

As illustrated in FIG. 2, the controller 12 includes, as the functions implemented by an installed program or the functions implemented by a hardware configuration, a basic command value determining unit 15, which sequentially determines a basic command value Tm_base for controlling the output torque of the electric motor 2 so as to converge the value (the detection value) of an actual rotary member driving torque $\tau$_act indicated by an output of the torque detector 11 to a desired torque $\tau$_cmd (hereinafter referred to as "the desired rotary member driving torque $\tau$_cmd), an observer 16, which sequentially determines a manipulated variable Tm_obs for correcting the basic command value Tm_base, and a motor control unit 17, which determines a desired control value Tm_cmd that defines the output torque to be actually generated in the electric motor 2 on the basis of the basic command value Tm_base and the manipulated variable Tm_obs and which controls the energization of the electric motor 2 according to the desired control value Tm_cmd.

The basic command value determining unit 15 corresponds to the basic command value determining unit in the present invention. The basic command value determining unit 15 determines the basic command value Tm_base such that the actual rotary member driving torque (the detection value) is converged to the desired rotary member driving torque $\tau$_cmd by using a feedback control rule. The basic command value Tm_base in the present embodiment is the command value of the torque output from the electric motor 2 through the reduction gear 3 (the output torque of the reduction gear 3), i.e. the command value obtained by multiplying the basic command value of the output torque of the electric motor 2 by the reduction ratio of the reduction gear 3.

The command value of the output torque itself of the electric motor 2 or the command value of the energizing current of the electric motor 2, for example, may be used as the basic command value.

Further, the observer 16 corresponds to the manipulated variable determining unit in the present invention. The observer 16 determines a manipulated variable Tm_obs for correcting the basic command value Tm_base (hereinafter referred to as "the corrective manipulated variable Tm_obs) such that the torque applied to the rotary member 5 according to the desired control value Tm_cmd is brought close to the estimated value of the torque to be generated at the driving side (hereinafter referred to as "the estimated two-inertia system driving torque value") when the power unit 1 is regarded as a two-inertia system having two inertial moments (inertias) at the driving side and a load side (when the power unit 1 is modeled using a two-inertia system model).

Of the two inertial moments, the inertial moment at the driving side is the total inertial moment of the rotary system that combines the electric motor 2, the reduction gear 3, and a part of the torsion bar 4 adjacent to the reduction gear 3, while the inertial moment at the load side is the total inertial moment of the rotary system that combines a part of the torsion bar 4 adjacent to the rotary member 5, the rotary member 5, and a member (not illustrated) rotating integrally with the rotary member 5. The inertial moment of the torsion bar 4 is normally sufficiently small. Therefore, the inertial moment contributed by the torsion bar 4 may be omitted from a set value of the inertial moment at the driving side or the inertial moment at the load side.

Further, the motor control unit 17 corresponds to the actuator control unit in the present invention. The motor control unit 17 corrects the basic command value Tm_base by the corrective manipulated variable Tm_obs (by adding Tm_obs to Tm_base in the present embodiment) thereby to determine the desired control value Tm_cmd. The desired control value Tm_cmd corresponds to the desired actuator control value in the present invention. The desired control value Tm_cmd in the present embodiment is the desired value of the torque output from the electric motor 2 through the reduction gear 3 (i.e. the desired value obtained by multiplying the desired value of the output torque of the electric motor 2 by the reduction ratio of the reduction gear 3).

The desired value of the output torque itself of the electric motor 2 or the desired value of the energizing current of the electric motor 2, for example, may be used as the desired control value.

The controller 12 carries out the processing by the basic command value determining unit 15, the observer 16, and the motor control unit 17 at a predetermined control processing cycle, thereby controlling the operation of the electric motor 2.

The controller 12 may further include a function for sequentially determining the desired rotary member driving torque $\tau\_cmd$.

The following will describe in detail the control processing carried out by the controller 12.

The controller 12 carries out the processing by the basic command value determining unit 15 and the observer 16 at each control processing cycle.

The basic command value determining unit 15 receives the desired rotary member driving torque $\tau\_cmd$ and the detection value of the actual rotary member driving torque $\tau\_act$ indicated by an output of the torque detector 11.

Then, the basic command value determining unit 15 inputs the detection value of the actual rotary member driving torque $\tau\_act$ based on the output of the torque detector 11 to a low-pass filter 15a for removing high-frequency noise components (a filter having the transfer function thereof expressed by $1/(1+s\cdot T)$ in the illustrated example). Thus, the basic command value determining unit 15 obtains a filtering value $\tau\_act\_filt$ obtained by subjecting the detection value of the actual rotary member driving torque $\tau\_act$ to low-pass filtering.

Next, the basic command value determining unit 15 determines the basic command value Tm_base from the filtering value $\tau\_act\_filt$ and the desired rotary member driving torque $\tau\_cmd$ by the arithmetic processing indicated by the block diagram of a processing section 15b in FIG. 2.

More specifically, the basic command value determining unit 15 determines Tm_base according to expression (1) given below.

$$Tm\_base = Kff\cdot\tau\_cmd + Kp\cdot(\tau\_cmd - \tau\_act\_filt) - Kd\cdot d\tau\_act\_filt \quad (1)$$

where $d\tau\_act\_filt$ denotes the temporal change rate (differential value) of $\tau\_act\_filt$, and Kff, Kp and Kd denote predetermined gain values set beforehand.

The first term of the right side of expression (1) denotes a feedforward manipulated variable component based on $\tau\_cmd$, and the second term and the third term thereof are feedback manipulated variable components based on the proportional-derivative (PD) law as a feedback control law.

The basic command value Tm_base is calculated according to expression (1) given above so as to determine the basic command value Tm_base such that the actual rotary member driving torque $\tau\_act$ is converged to the desired rotary member driving torque $\tau\_cmd$.

The basic command value Tm_base may be determined using a feedback control law other than the PD law.

The observer 16 receives a latest value of the desired control value Tm_cmd already determined by the motor control unit 17 (specifically, the previous value determined at the previous control processing cycle), the detection value of an actual rotational velocity $\omega m\_act$ of the output shaft 2a of the electric motor 2 indicated by an output of the rotation detector 10 (hereinafter referred to as "the actual motor rotational velocity $\omega m\_act$"), and the detection value of the actual rotary member driving torque $\tau\_act$ indicated by an output of the torque detector 11.

Then, the observer 16 carries out the arithmetic processing indicated by the block diagram of a processing section 16a in FIG. 2 from the received Tm_cmd (the previous value), the detection value of $\omega m\_act$, and the detection value of $\tau\_act$, thereby calculating a difference $\Delta tm$ between an estimated two-inertia system driving torque value Tm_mdl2 and the desired control value Tm_cmd (the previous value).

More specifically, the observer 16 calculates $\Delta tm$ according to expression (2) given below. The difference $\Delta tm$ denotes the basic value of the corrective manipulated variable Tm_obs.

$$\Delta tm = Tm\_cmd - Tm\_mdl2 = Tm\_cmd - (Jr\cdot d\omega m\_act + \tau\_act) \quad (2)$$

where Jr denotes a set value of the inertial moment at the driving side of the two-inertia system (the total inertial moment of the rotary system that combines the electric motor 2, the reduction gear 3, and a part of the torsion bar 4); and $d\omega m\_act$ denotes the temporal change rate (differential value) of the actual motor rotational velocity $\omega m\_act$, i.e. $d\omega m\_act$ corresponds to the detection value of the actual rotational angular velocity of the output shaft 2a of the electric motor 2. The $d\omega m\_act$ corresponds to the displacement acceleration of the output section of the actuator in the present invention.

The parenthesized term of the right side of expression (2) denotes the estimated two-inertia system driving torque value Tm_mdl2. In this case, $Jr\cdot d\omega m\_act$ corresponds to the inertial force (moment) accompanying the rotational motion of the output shaft 2a of the electric motor 2 and the input section 3a and the output section 3b of the reduction gear 3. Thus, Tm_mdl2 has a meaning as the resultant moment of the inertial force (moment), which is defined by the set value of Jr and the detection value of $d\omega m\_act$, and the actual rotary member driving torque $\tau\_act$ (the resultant moment corresponding to the resultant force in the present invention).

Supplementary, expression (2) is an example of expression (B1) given above. In this case, $\Delta tm$, Tm_cmd, $\tau\_act$, Jr, and $d\omega m\_act$ correspond to the linearly combined value, Fc, Fa, J, and (dV/dt), respectively, in expression (B1). In expression (2), the value of $\alpha 2$ in expression (B1) is 1. Alternatively, however, $\alpha 2$ may be set to a value 0) other than 1.

The observer 16 subjects the difference $\Delta tm$ calculated as described above to the low-pass filtering by a low-pass filter 16b (the illustrated example is a filter having the transfer function thereof expressed by $1/(1+s\cdot Tobs)$). Further, the observer 16 uses a processing section 16c to determine the corrective manipulated variable Tm_obs by multiplying an output of the low-pass filter 16b by a predetermined gain value Kobs that is set beforehand.

A time constant Tobs of the low-pass filter 16b (i.e. the cutoff frequency of the low-pass filter 16b) is set in advance on the basis of experiments or simulations such that the occurrence of the oscillation phenomenon of torque can be prevented while controlling the operation of the electric motor 2 to control the torque to be applied to the rotary member 5.

The processing by the observer 16 described above determines the corrective manipulated variable Tm_obs such that the control command value Tm_cmd sequentially determined by the motor control unit 17 is brought close to the estimated two-inertia system driving torque value Tm_mdl2 (such that the difference $\Delta tm$ is brought close to zero) within the passing frequency band of the low-pass filter 16b.

The controller 12 carries out the processing by the basic command value determining unit 15 and the observer 16 as described above and then carries out the processing by the motor control unit 17.

The motor control unit 17 receives the basic command value Tm_base and the corrective manipulated variable Tm_obs determined at each control processing cycle.

The motor control unit 17 then adds the corrective manipulated variable Tm_obs (the current value determined at the current control processing cycle) to the basic command value Tm_base (the current value determined at the current control processing cycle) thereby carrying out the processing of correcting Tm_base by an arithmetic section 17a. By the correction processing, the desired control value Tm_cmd (current value) for controlling the actual output torque of the electric motor 2 is determined.

Further, the motor control unit 17 controls the energization of the electric motor 2 by an energization control section 17b on the basis of the desired control value Tm_cmd determined as described above.

To be specific, the energization control section 17b converts the desired torque of the electric motor 2 defined by the desired control value Tm_cmd (the value obtained by dividing Tm_cmd by the reduction ratio of the reduction gear 3 in the present embodiment) into a current command value of the electric motor 2. Then, the energization control section 17b feedback-controls the energizing current such that the actual energizing current (a detection value provided by a current sensor, which is not illustrated) agrees with the current command value.

Thus, the electric motor 2 is controlled to output a torque that coincides with the desired torque of the electric motor 2 defined by the desired control value Tm_cmd (in other words, a torque that causes the output torque of the reduction gear 3 to coincide with the desired control value Tm_cmd).

According to the present embodiment, the control processing by the controller 12 is carried out as described above.

According to the system of the present embodiment described above, the controller 12 corrects the basic command value Tm_base determined to converge the actual rotary member driving torque τ_act to the desired rotary member driving torque τ_cmd by using the corrective manipulated variable Tm_obs determined by the observer 16, thereby determining the desired control value Tm_cmd for controlling the actual energization of the electric motor 2.

Thus, the desired control value Tm_cmd is determined to achieve as much as possible the desired rotary member driving torque τ_cmd while restraining as much as possible the driving torque applied to the rotary member 5 according to the desired control value Tm_cmd from deviating from the estimated two-inertia system driving torque value Tm_mdl2.

In this case, the estimated two-inertia system torque value Tm_mdl2 is the parenthesized term of the right side of expression (2) and therefore corresponds to the estimated value of the driving torque of the rotary member 5 in the case where the rotary system that combines the electric motor 2 and the reduction gear 3 is regarded as a rotary system that has only the inertial moment Jr at the driving side without having the springiness, friction or viscosity.

Hence, the desired control value Tm_cmd can be determined such that the influence of the springiness between the input section 3a and the output section 3b of the reduction gear 3 or the influence of the rotational friction or viscosity of the output shaft 2a of the electric motor 2 or the rotational friction or the viscosity of the input section 3a or the output section 3b of the reduction gear 3 can be compensated for.

This makes it possible to effectively suppress the occurrence of the oscillation phenomenon of the actual rotary member driving torque τ_act or the deviation of the actual rotary member driving torque τ_act from the desired rotary member driving torque τ_cmd.

Further, the oscillation phenomenon of the actual rotary member driving torque τ_act can be suppressed, so that the feedback gain (the gain value Kp or Kd) in the basic command value determining unit 15 can be set to a large value. This permits higher responsiveness of the actual rotary member driving torque τ_act to follow the desired rotary member driving torque τ_cmd.

Second Embodiment

Figure 3:
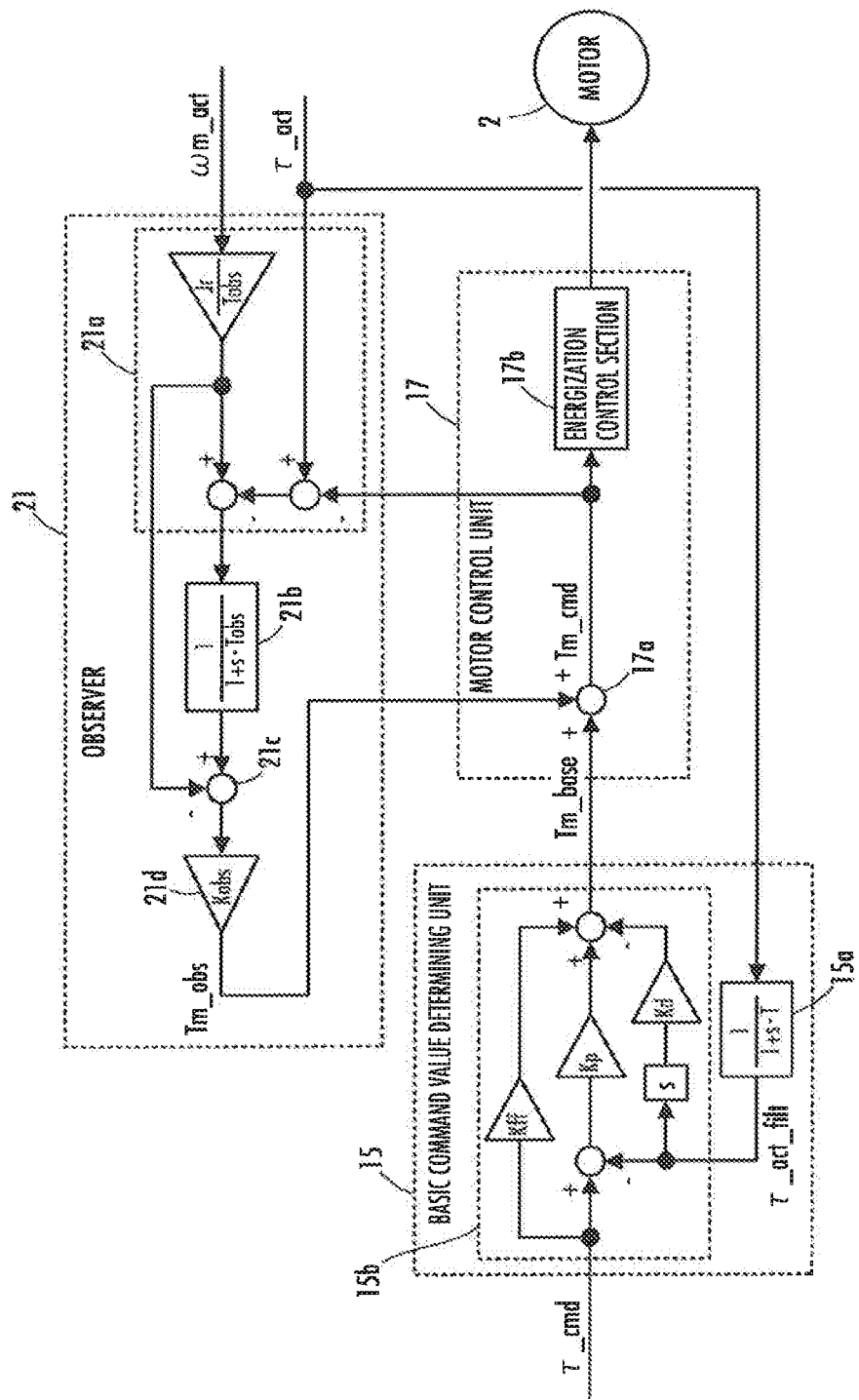
FIG. 3 is a block diagram illustrating a configuration related to control according to a second embodiment of the present invention.

Referring now to FIG. 3, a second embodiment of the present invention will be described. The present embodiment differs from the first embodiment only partly in the control processing by a controller 12. Hence, the description of the same aspects as those of the first embodiment will be omitted.

Referring to FIG. 3, the present embodiment differs from the first embodiment only partly in the processing by an observer 21.

The observer 21 in the present embodiment carries out the so-called pseudo differential processing to determine a corrective manipulated variable Tm_obs without directly differentiating the detection value of an actual motor rotational velocity ωm_act indicated by an output of a rotation detector 10.

To be specific, the observer 21 in the present embodiment has a low-pass filter 21b (a filter having the transfer function thereof expressed by 1/(1+s–Tobs) in the illustrated example), which is the same as that in the first embodiment. Further, the observer 21 carries out the arithmetic processing by a processing section 21a at each control processing cycle thereby to determine the input value of the low-pass filter 21b. More specifically, the observer 21 determines the input value of the low-pass filter 21b according to expression (3) given below.

$$\text{Input value of the low-pass filter} = Tm\_cmd - \tau\_act + (Jr/Tobs) \cdot \omega m\_act \quad (3)$$

The meanings of the variables in expression (3) are the same as those in the first embodiment. Accordingly, the input value of the low-pass filter 21b is calculated as a linearly combined value of the desired control value Tm_cmd, the detection value of the actual rotary member driving torque τ_act, and the detection value of the actual motor rotational velocity ωm_act. In this case, the coefficient value of ωm_act is the ratio between the inertial moment Jr at the driving side of the two-inertia system and the time constant Tobs of the low-pass filter 21b.

In the present embodiment, the actual motor rotational velocity ωm_act corresponds to the displacement velocity of the output section of the actuator in the present invention.

Supplementary, expression (3) given above is an example of expression (A2) given above. In this case, the input value of the low-pass filter, Tm_cmd, τ_act, Jr, Tobs and ωm_act correspond to the linearly combined value, Fc, Fa, J, Tobs and V, respectively, in expression (A2). In expression (3), the value of α1 in expression (A2) is 1. However, α1 may be set to a value (≠0) other than 1.

Further, the observer 21 carries out, at a processing section 21c, the subtraction of the term of ωm_act of expression (3) given above, namely, the third term (Jr/Tobs)·ωm_act, from an output value of the low-pass filter 21*b*.

The output value of the processing section 21*c* will eventually correspond to an output value of the low-pass filter 16*b* (the value obtained by inputting the difference Δtm to the low-pass filter 16*b*) in the first embodiment.

Then, the observer 21 determines, by a processing section 21*d*, a corrective manipulated variable Tm_obs by multiplying a predetermined gain value Kobs set beforehand by the output value of the processing section 21*c*.

The present embodiment is the same as the first embodiment except for the aspects described above.

The present embodiment is also capable of providing the same advantages as those of the first embodiment. In addition, the present embodiment obviates the need for the processing of calculating the differential value of the detection value of the actual motor rotational velocity ωm_act. This makes it possible to enhance the stability or the reliability of the corrective manipulated variable Tm_obs. Consequently, the robustness of the control of the actual rotary member driving torque τ_act can be enhanced.

[Verification Test]

The description will be given of the advantage of the provision of the observer 21 in the system of one of the first embodiment and the second embodiment, namely, in the second embodiment, for example, with reference to FIG. 4 to FIG. 9.

Figure 4:
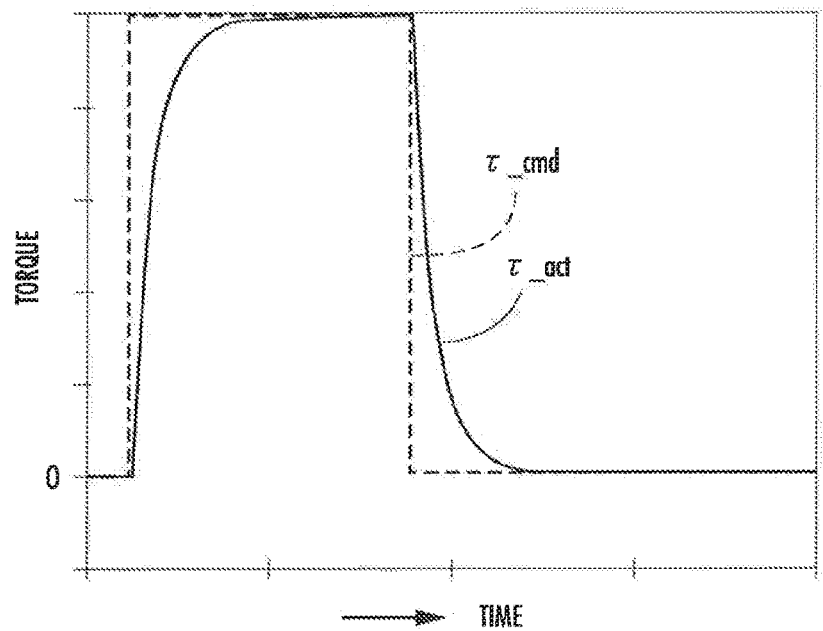
FIG. 4, FIG. 5, and FIG. 6 are graphs illustrating the simulation data of verification tests related to an embodiment.
Figure 5:
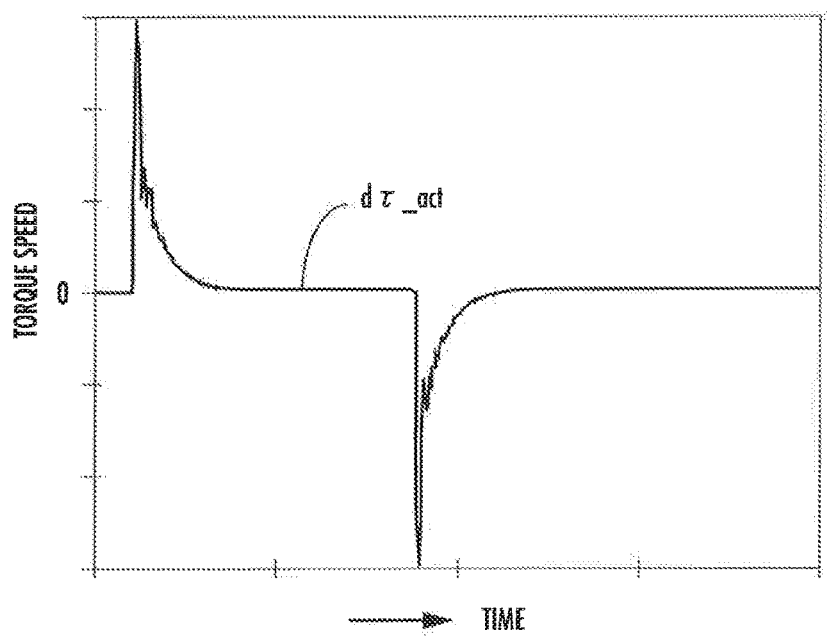
Figure 6:
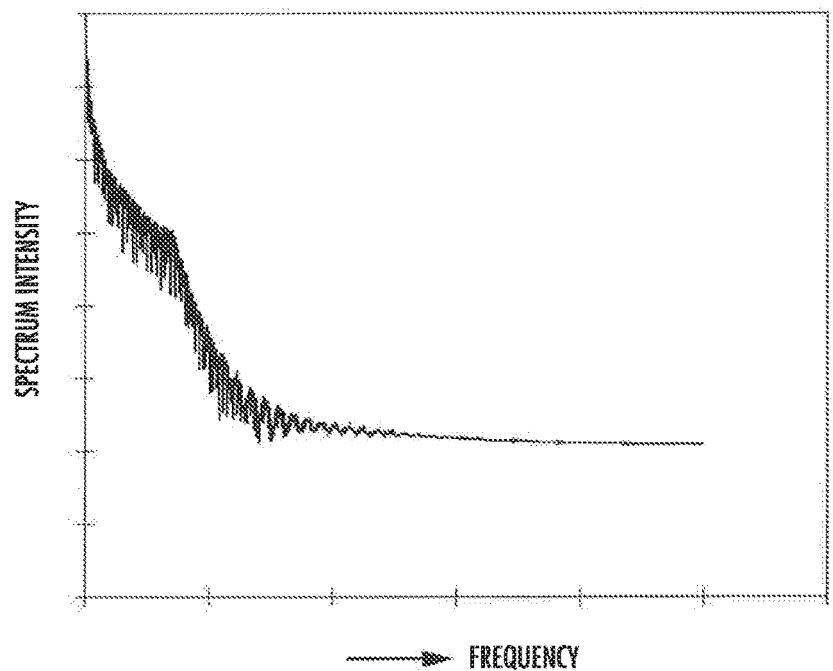

FIG. 4 to FIG. 6 are graphs illustrating the measurement data of the embodiment. For the embodiment, a simulation has been carried out to observe the actual rotary member driving torque τ_act when the desired rotary member driving torque τ_cmd is changed in steps in the system of the second embodiment. FIG. 4 is a graph illustrating the simulation data of the temporal change of the actual rotary member driving torque τ_act in the embodiment, FIG. 5 is a graph illustrating the temporal change of a torque speed dτ_act, which is the temporal change rate (differential value) of the actual rotary member driving torque in FIG. 4, and FIG. 6 is a graph illustrating the frequency characteristics of the waveform of the actual rotary member driving torque τ_act in FIG. 4.

Figure 7:
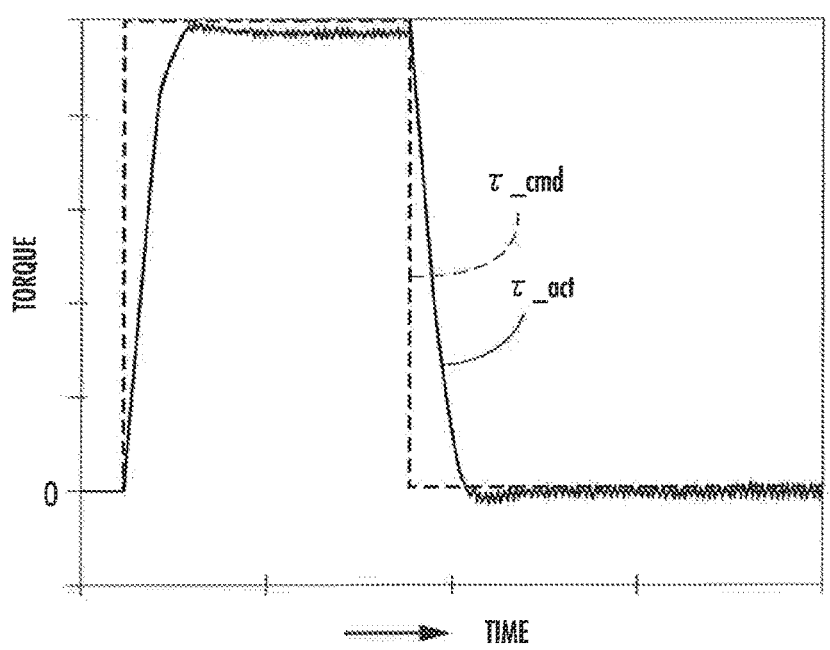
FIG. 7, FIG. 8 and FIG. 9 are graphs illustrating the simulation data of verification tests related to a comparative example.
Figure 8:
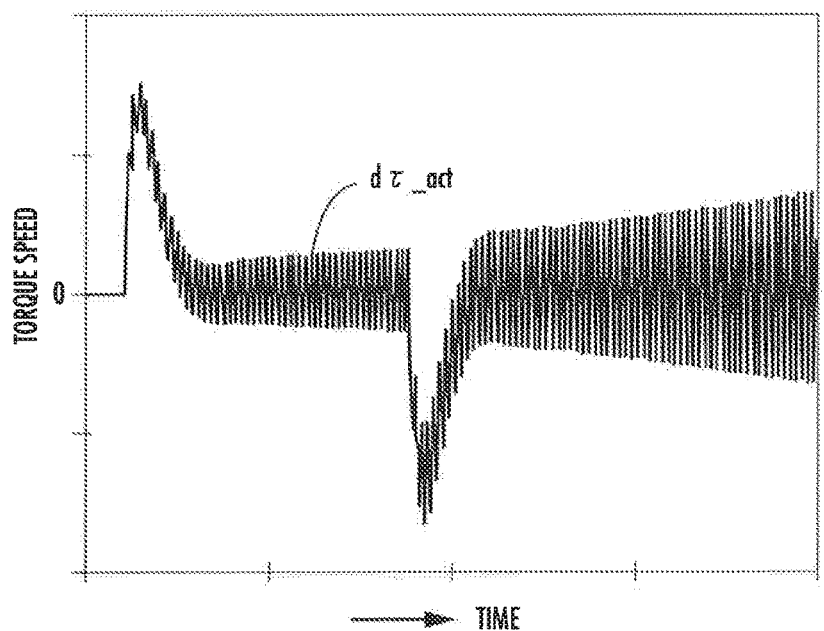
Figure 9:
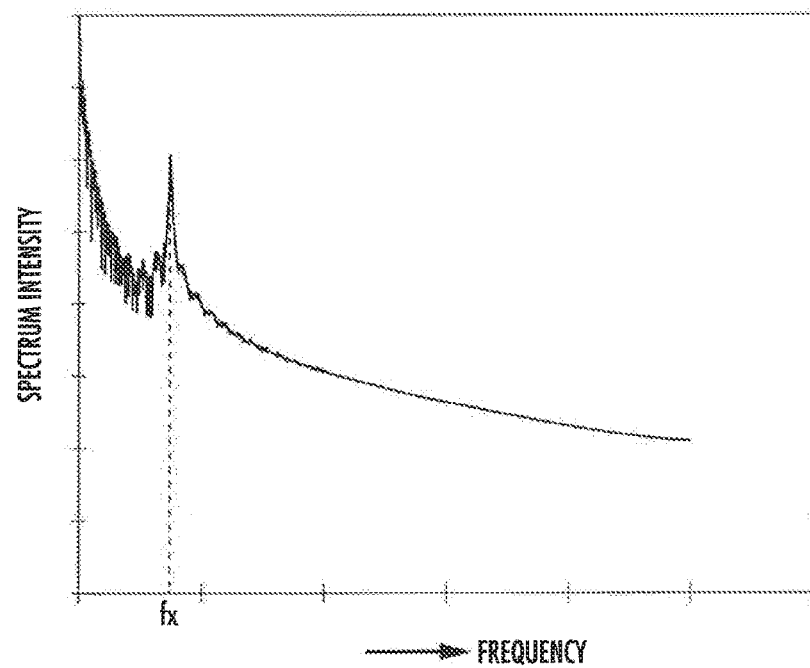

Further, FIG. 7 to FIG. 9 are graphs illustrating the measurement data of a comparative example. In the case of the comparative example, the observer 21 in the system of the second embodiment was turned off (in other words, Tm_obs was constantly maintained to be zero) in the simulation to observe the actual rotary member driving torque τ_act when the desired rotary member driving torque τ_cmd is changed in steps. FIG. 7 is a graph illustrating the simulation data of the temporal change of the actual rotary member driving torque τ_act in the comparative example, FIG. 8 is a graph illustrating the temporal change of the torque speed dτ_act, which is the temporal change rate (differential value) of the actual rotary member driving torque τ_act illustrated in FIG. 7. FIG. 9 is a graph illustrating the frequency characteristics of the waveform of the actual rotary member driving torque τ_act illustrated in FIG. 7.

In the simulations, the power unit 1 has been approximated using the three-inertia system model, which has three rotary elements corresponding to the electric motor 2, the reduction gear 3, and the rotary member 5. The dynamic behaviors of the three-inertia system are represented by, for example, expressions (4a) to (4c) given below.

$$Jm \cdot d\omega m = -Ks \cdot (\theta m - \theta wg) - Dm \cdot \omega m + \tau m \quad (4a)$$

$$Jwg \cdot d\omega wg = Ks \cdot (\theta m - \theta wg) - Ktb \cdot (\theta wg - \theta L) \quad (4b)$$

$$JL \cdot d\omega L = Ktb \cdot (\theta wg - \theta L) - DL \cdot \omega L + \tau L \quad (4c)$$

where Jm: Inertial moment of the rotary section of the electric motor 2; Jwg: Inertial moment of the rotary section of the reduction gear 3; JL: Inertial moment of the rotary member 5; θm: Rotational angle obtained by dividing the rotational angle of the electric motor 2 by the reduction ratio of the reduction gear 3; θwg: Rotational angle of the output section of the reduction gear 3; θL: Rotational angle of the rotary member 5; ωm: Temporal change rate (angular velocity) of θm; ωwg: Temporal change rate (angular velocity) of θwg; ωL: Temporal change rate (angular velocity) of θL; dωm: Temporal change rate (angular acceleration) of ωm; dωwg: Temporal change rate (angular acceleration) of ωwg; dωL: Temporal change rate (angular acceleration) of ωL; Ks: Spring constant that denotes the degree of rigidity of the system extending from the electric motor 2 to the reduction gear 3; Ktb: Spring constant that denotes the degree of rigidity of the torsion bar 4; Dm: Viscosity coefficient related to the rotation of the output shaft 2*a* of the electric motor 2; DL: Viscosity coefficient related to the rotation of the rotary member 5; τm: Torque obtained by multiplying the output torque of the electric motor 2 by the reduction ratio of the reduction gear 3; and τL: Load torque of the rotary member 5. The value of Ks is set to be dependent primarily on the springiness of the reduction gear 3.

As the comparison between FIG. 4 and FIG. 7 or between FIG. 5 and FIG. 8 indicates, the actual rotary member driving torque τ_act in the comparative example exhibits relatively marked high frequency fluctuations with respect to the desired rotary member driving torque τ_cmd. In contrast, the actual rotary member driving torque τ_act in the embodiment hardly exhibits high frequency fluctuations. Further, the actual rotary member driving torque τ_act smoothly follows the desired rotary member driving torque τ_cmd with high stability. In comparison with the comparative example, the embodiment has a higher response speed (i.e. a larger the magnitude of dτ_act) of the actual rotary member driving torque τ_act in response to a change in the desired rotary member driving torque τ_cmd and also has a lower steady-state deviation.

Further, the comparison between FIG. 6 and FIG. 9 indicates that the comparative example includes a relatively large oscillation component in the vicinity of a specific frequency fx (refer to FIG. 9), whereas the embodiment prevents the oscillation component, which is observed in the comparative example, from being included.

Thus, it is understood that the system according to the embodiment effectively prevents the occurrence of the oscillation phenomenon of the actual rotary member driving torque τ_act. It is also understood that the actual rotary member driving torque τ_act can be stably controlled to follow the desired rotary member driving torque τ_cmd with high accuracy.

[Modifications]

The following will describe some modifications related to the embodiments described above.

The actuator in each of the foregoing embodiments is the electric motor 2, however, the actuator in the present invention may alternatively be, for example, a hydraulic actuator or an actuator other than an electric motor. Further, the actuator in the present invention is not limited to a rotary type actuator, and may alternatively be a linear motion type actuator, such as a cylinder or linear type motor.

If the actuator is a rotary type actuator, then the driving force output from the actuator will be a rotational driving force (torque), and if the actuator is a linear motion type actuator, then the driving force output from the actuator will be a translational driving force (translational force).

Further, the power transmission element in the present invention is not limited to a reduction gear and may alternatively be a speed-up gear. Alternatively, the power transmission element may be any other power transmission elements, such as a ball screw, adapted to implement the conversion between a linear motion and a rotational motion, insofar as the elements have springiness.

Further, the element to be driven in the present invention is not limited to a rotary member and may alternatively be a linear motion member, such as a piston.

Further, the spring member in the present invention is not limited to a torsion bar and may alternatively be other types of spring members, such as a flat spiral spring, a coil spring or a leaf spring.

In the foregoing embodiments, the system extending from the electric motor 2 (the actuator) to the torsion bar 4 is a rotary system, so that the set value of the inertial moment Jr is used in the processing by the observer 16 and 21.

However, if, for example, the system extending from an actuator to a spring member in a power unit is configured to apply a translational force to the spring member, then the manipulated variable for correcting the basic command value of the actuator may be determined by carrying out the same processing as the processing by the observer 16 or 21 by using a set value of the inertial mass of the system.

What is claimed is:

1. A control system for a power unit that has an actuator, which outputs a driving force for actuating an element to be driven, and a spring member, which receives the driving force of the actuator through the intermediary of a power transmission element, converts the received driving force into an elastic force, and outputs the elastic force to the element to be driven, the power transmission element being configured to have springiness between an input section thereof adjacent to the actuator and an output section thereof adjacent to the spring member, the control system comprising:
   a force detector that generates an output based on a force actually applied to the element to be driven;
   a displacement motion detector that generates an output based on a displacement motion of the output section of the actuator, wherein the displacement motion is one of a displacement amount and a displacement velocity;
   an electronic control unit including at least one processor and memory on which is stored a program, for execution of the program by each of the at least one processor, the electronic control unit comprising:
   a basic command value determining unit that sequentially determines a basic command value for controlling the driving force of the actuator according to the output of the force detector and a desired value of a force to be applied to the element to be driven so as to converge a value of the force indicated by the output of the force detector to the desired value of the force;
   an actuator control unit that sequentially determines a desired actuator control value that defines the driving force to be actually output from the actuator and controls the actuator according to the desired actuator control value; and
   a manipulated variable determining unit that determines a manipulated variable for correcting the basic command value based on the output of the displacement motion detector, the output of the force detector, and the desired actuator control value determined by the actuator control unit so as to bring the driving force, which is to be applied to the element to be driven according to the desired actuator control value, close to a resultant force of an inertial force, which is defined by a value of a displacement acceleration of the output section of the actuator indicated by the output of the displacement motion detector and a predetermined value of an inertial mass or an inertial moment of a system extending from the actuator to the spring member, and the force indicated by the output of the force detector,
   wherein the actuator control unit is configured to determine the desired actuator control value by correcting the basic command value according to the manipulated variable at a time of determining a new desired actuator control value.

2. The control system for the power unit according to claim 1,
   wherein the manipulated variable determining unit comprises a low-pass filter to which a linearly combined value of a value of the displacement velocity of the output section of the actuator indicated by the output of the displacement motion detector, a value of the force indicated by the output of the force detector, and an estimated value of the driving force applied to the element to be driven according to the desired actuator control value are input, and the manipulated variable determining unit is configured to determine the manipulated variable by multiplying a difference between an output value of the low-pass filter and a term related to the value of the displacement velocity in the linearly combined value by a predetermined gain value.

3. The control system for the power unit according to claim 2,
   wherein the low-pass filter is configured such that the transfer function thereof is represented by expression (A1) given below, and the manipulated variable determining unit is configured to input the linearly combined value calculated according to expression (A2) given below to the low-pass filter:

$$\text{The transfer function} = 1/(1+s \cdot Tobs) \tag{A1}$$

where Tobs: Predetermined time constant;

$$\text{The linearly combined value} = \alpha 1 \cdot ((J/Tobs) \cdot V - Fa + Fc) \tag{A2}$$

where α1: Arbitrary constant other than zero; J: predetermined value of the inertial mass or inertial moment; V: Value of the displacement velocity of the output section of the actuator; Fa: Value of the force indicated by the output of the force detector; and Fc: Estimated value of the driving force.

4. The control system for the power unit according to claim 1,
   wherein the manipulated variable determining unit comprises a low-pass filter that receives a linearly combined value obtained by linearly combining, according to expression (B1) given below, a temporal change rate of the displacement velocity (dV/dt) of the output section of the actuator indicated by the output of the displacement motion detector, a value of force (Fa) indicated by the output of the force detector, and an estimated value of the driving force (Fc) applied to the element to be driven according to the desired actuator control value, and the manipulated variable determining unit is configured to determine a value obtained by multiplying an output value of the low-pass filter by a predetermined gain value as the manipulated variable:

$$\text{Linearly combined value} = \alpha 2 \cdot (Fc - Fa - J \cdot (dV/dt)) \tag{B1}$$

where α2: Arbitrary constant other than zero; and J: predetermined value of the inertial mass or inertial moment.

* * * * *